(12) United States Patent
Scully

(10) Patent No.: US 12,151,802 B2
(45) Date of Patent: Nov. 26, 2024

(54) PROPELLER BLADE-TIP FLOW ISOLATOR

(71) Applicant: Kevin Michael Scully, La Jolla, CA (US)

(72) Inventor: Kevin Michael Scully, La Jolla, CA (US)

(73) Assignee: Kevin Michael Scully, La Jolla, CA (US)

( * ) Notice: Subject to any disclaimer, the term of this patent is extended or adjusted under 35 U.S.C. 154(b) by 597 days.

(21) Appl. No.: 16/340,116

(22) PCT Filed: Nov. 7, 2016

(86) PCT No.: PCT/US2016/056171
§ 371 (c)(1),
(2) Date: Apr. 7, 2019

(87) PCT Pub. No.: WO2017/062900
PCT Pub. Date: Apr. 13, 2017

(65) Prior Publication Data
US 2020/0010173 A1 Jan. 9, 2020

(51) Int. Cl.
*B64C 11/18* (2006.01)
*B64C 23/06* (2006.01)
*F03D 1/06* (2006.01)

(52) U.S. Cl.
CPC ............ *B64C 11/18* (2013.01); *B64C 23/069* (2017.05); *F03D 1/0641* (2013.01); *F05B 2240/30* (2013.01); *F05B 2260/96* (2013.01)

(58) Field of Classification Search
CPC ..... B64C 11/18; B64C 23/069; F03D 1/0641; F05B 2240/30; F05B 2260/96
USPC .......................................... 244/199.2, 199.4
See application file for complete search history.

(56) References Cited

U.S. PATENT DOCUMENTS

| | | | | |
|---|---|---|---|---|
| 2,576,981 | A * | 12/1951 | Vogt ..................... | B64C 23/069 244/91 |
| 4,108,403 | A * | 8/1978 | Finch .................... | B64C 23/065 244/199.2 |
| 4,377,267 | A * | 3/1983 | Haworth ............... | B64C 23/069 244/199.4 |
| 4,382,569 | A * | 5/1983 | Boppe ................... | B64C 23/069 244/199.4 |
| 4,478,380 | A * | 10/1984 | Frakes .................. | B64C 23/069 244/199.3 |
| 4,595,160 | A * | 6/1986 | Santos .................. | B64C 23/069 244/199.4 |
| 4,714,215 | A * | 12/1987 | Jupp ..................... | B64C 23/069 244/199.4 |
| 5,634,613 | A * | 6/1997 | McCarthy ............. | B64C 23/069 244/199.1 |
| 9,033,282 | B2 * | 5/2015 | Wright .................. | B64C 23/069 244/199.4 |
| 9,302,766 | B2 * | 4/2016 | Gratzer ................. | B64C 23/069 |

(Continued)

*Primary Examiner* — Joshua E Rodden

(57) ABSTRACT

A blade-tip flow isolator that can be used on a propeller, rotor, or wind turbine is provided. The blade-tip flow isolator integrates with the blade at the outer radius and shields the blade-tip boundary layer, reducing blade-tip vortices. A twist along the blade-tip chord further reduces or eliminates the blade-tip vortices that inherently occur on the exposed blade tips during normal operations. Efficiency and performance are improved while noise and acoustic levels are reduced.

4 Claims, 10 Drawing Sheets

(56) References Cited

U.S. PATENT DOCUMENTS

| | | | | |
|---|---|---|---|---|
| 2004/0061029 A1* | 4/2004 | McCarthy | ............. | B64C 23/072 |
| | | | | 244/199.4 |
| 2011/0070090 A1* | 3/2011 | Hugues | ..................... | F15D 1/10 |
| | | | | 416/223 R |
| 2015/0003994 A1* | 1/2015 | Braaten | ................. | F03D 1/0633 |
| | | | | 416/237 |
| 2017/0370345 A1* | 12/2017 | Keeley | .................. | F03D 1/0633 |
| 2020/0017200 A1* | 1/2020 | Wood | .................... | B64C 23/069 |

\* cited by examiner

PROPELLER BLADE-TIP FLOW ISOLATOR

CROSS REFERENCES

This application claims priority to International application PCT/US16/56171, filed 7 Oct. 2016.

BACKGROUND

Propellers are mechanical devices used to convert rotational shaft power into thrust and propulsion on a wide range of applications such as aircraft, drones, UAV's, ships, boats, submarines, and submersibles. On large ships, propellers are also referred to as "screws". Wind turbines convert the kinetic energy from wind into rotating shaft power, which is usually converted into electrical power. Helicopters and tilt rotor aircraft use rotors for lift and propulsion.

Propellers, rotors, screws, wind turbines, and other rotating mechanical devices that convert rotating shaft power to or from a fluid share the same structure. The geometry and blade count vary based on the specific application, but they are all rotating mechanical devices with two or more attached angled blades and can operate on compressible or incompressible fluids.

These mechanical devices all share the same disadvantages: fluid from the high-pressure blade surface can slip around the blade tip towards the low-pressure blade surface, generating non-axial fluid flow components and blade-tip vortices. These vortices spin off each blade tip in a helical shape, tracing the blade-tip path through the fluid stream. Non-axial fluid flow components, swirls and vortices are undesirable features, as they reduce efficiency and generate unwanted sound and acoustic signatures.

To reduce blade-tip vortices generated by exposed blade tips, many blades are designed with the maximum blade width in the middle region of the blade radius, decreasing radially outward to a minimum width at the blade tip. This results in pressure profiles and boundary layers that vary radially outward from the axis of rotation towards the blade tip, which contributes to non-axial fluid flow components and blade-tip vortices.

The paradox with tapered blade designs is that a reduction in blade width towards the blade tip also results in increased non-axial fluid flow components, which contributes to blade-tip vortices.

PRIOR ART

One way to eliminate blade-tip vortices is to contain the blades within an enclosed barrier or shroud, resulting in a ducted flow application such as a gas turbine or jet engine nacelle. The blade tip designs for ducted fluid flow applications in the prior art are designed to reduce blade tip leakage, reduce blade tip wear, provide blade tip cooling, or perform other functions not related to the present invention. The present invention provides a simple solution to reduce blade-tip vortices without the enclosed barrier, additional parts, and systems associated with ducted flow applications.

Vortex generators create vortices along the blade surface to affect the boundary layer and increase efficiency. The present invention reverses the blade-tip vortex at the blade tip, induces a reversed vortex, and is different from the vortex generators that are implemented along the blade surface.

U.S. Pat. Nos. 9,039,381, 8,038,396, 7,927,078, and U.S. Patent Applications 20160222941 and 20160177914 utilize vortex generators on the blade surface and are different from the present invention.

U.S. Pat. No. 8,690,536 uses a vortex generator to reduce the blade tip leakage in a ducted turbine application. The non-rotating enclosed barrier is used to block the blade-tip vortices, unlike the present invention, which provides a simple alternative to the enclosed barrier required for ducted flow applications.

U.S. Pat. Nos. 6,948,906 and 4,596,512 use internal passages inside the blade, allowing fluid to exit the blade tip face. The present invention does not contain passages and does not allow fluid flow out of the blade tip face.

U.S. Patent Application 20150247411 uses internal passages as vortex generators to reduce the leakage in a ducted fluid flow application. The present invention does not contain passages and does not allow fluid flow out of the blade tip face. The present invention also provides a simple alternative to the enclosed barrier required for ducted flow applications and is therefore not related.

U.S. Pat. Nos. 7,467,921, 6,749,152, 6,478,541, 5,735,670, 5,620,304, and 5,620,303 change the geometry of the blade during rotation, requiring additional means to affect these changes and are not related to the present invention, which uses a geometry that does not change during operation.

The outer most region of the blade to the blade tip is the largest contributing factor to blade-tip vortices. The prior art contains numerous variations in blade geometry moving radially outward from the axis of rotation towards the blade tip. Geometric blade variations inside of the blade-tip termination surface at the blade radius are not related to the present invention.

U.S. Pat. No. 5,788,191 uses a blade geometry that changes towards the blade tip along with triangular shaped vortex generators near the tip to increase performance or efficiency and is different from the present invention.

U.S. Pat. Nos. 9,085,359, 7,854,595, 7,513,750, 7,246,998, and 6,976,829 change the blade geometry by reducing the cord length and/or bend the blade moving radially outward towards the blade tip and are different from the present invention.

U.S. Pat. No. 6,761,539 changes the blade tip geometry by reducing the blade thickness towards the blade tip and is different from the present invention.

The blade tip region is subject to the most wear and damage. The prior art contains many replaceable blade tip solutions. The present invention can be implemented as a rigid continuation of the blade or attached using another desired method.

U.S. Pat. Nos. 9,399,919, 9,371,817, 7,771,173, 7,762,785, 7,758,312, and 8,647,068 use replaceable blade tips that also vary in geometry radially outward towards the blade tip and are unrelated to the present invention.

U.S. Pat. Nos. 5,885,059 and 5,320,494 present a blade tip material and process along with a geometry that varies radially outward towards the blade tip and are unrelated to the present invention.

U.S. Pat. Nos. 5,885,059 and 5,320,494 present blade tip material and process along with a geometry that varies radially outward towards the blade tip and are unrelated to the present invention.

Blade end-plate designs and blade tips with a 90-degree bend have been used to increase efficiency. However, they do not provide a complete barrier of the boundary layer at the blade tip and/or extend beyond the boundary layer protruding into the fluid stream. Unshielded regions of the boundary layer allow blade-tip vortices and undesirable fluid flow components to develop. Extending beyond the boundary layer into the fluid stream increases drag and adds extra unnecessary mass that increases the centrifugal and dynamic forces that must be accommodated by the propeller blade, shaft, and shaft bearings.

U.S. Pat. No. 9,366,224 presents a blade configured with a tip that splits along the blade plane into two rounded contours that connect to two winglets, one on the high pressure side and one on the low pressure side. This design contains rounded contours connecting the winglets to the blade body, unlike the present invention, which contains no rounded contours. The winglets and rounded contours extend well beyond the blade boundary layer into the fluid stream, increasing drag and adding extra mass, unlike the present invention which does not protrude into the fluid stream beyond the boundary layer. Additionally the present invention induces a reversed vortex to counteract the naturally occurring blade-tip vortices.

U.S. Patent Application 20160153424 presents a blade tip device with mountable means, unlike the present invention, which can be integrated rigidly at the blade tip, creating a continuous solid piece. The profile shape is triangularly arranged, creating a W shape which protrudes well beyond the blade-tip boundary layer, adding drag and mass. This differs from the present invention, which does not protrude out into the fluid stream beyond the boundary layer. Additionally the present invention induces a reversed vortex to counteract the naturally occurring blade-tip vortices.

U.S. Patent Application 20110070090 presents a blade tip configuration with a cylindrical tube facing into the fluid stream at the blade tip to counteract noise and blade-tip vortices. The counteracting swirl is generated inside the tube, which starts in the middle of the blade tip. This method uses a ducted cylindrical flow and differs from the present invention, which does not contain any internal flow components or means.

Advantages

Accordingly, several advantages of one or more aspects of the present invention when integrated with a rotating propeller blade tip are: to increase axial fluid flow components, to reduce fluid swirls and blade-tip vortices, to reduce acoustic levels, to improve efficiency when converting rotating shaft power to axial thrust, to improve efficiency when converting kinetic energy from a fluid stream into rotating shaft power, to simplify propeller blade designs, to provide more power transformation for a given propeller diameter. Other advantages of one or more aspects will be apparent from a consideration of the drawings and ensuing description.

Objective

It is therefore an objective of the present invention to provide a blade-tip flow isolator derived from the blade tip geometry and boundary layer of a propeller, rotor, wind turbine, or other rotating mechanical devices that converts rotating shaft power to or from a fluid using 2 or more attached blades. The blade-tip flow isolator shields the boundary layer on the high-pressure blade surface at the blade tip and the boundary layer on the low-pressure blade surface at the blade tip. With the boundary layers shielded at the blade tip, the fluid slippage around the blade tip is blocked reducing blade-tip vortices. When rigidly attached to a propeller, rotor, wind turbine, or other similar device higher efficiency is achieved when converting rotating shaft power into axial thrust or when converting kinetic energy from a fluid stream into rotating shaft power. Lower acoustic levels are also achieved. These advantages are further improved by introducing a twist along the blade-tip chord in the opposite direction to the vortex that inherently occurs along the blade tip during normal operations. These advantages can be achieved in a compressible or incompressible fluid application (such as air or water).

Figure 1:
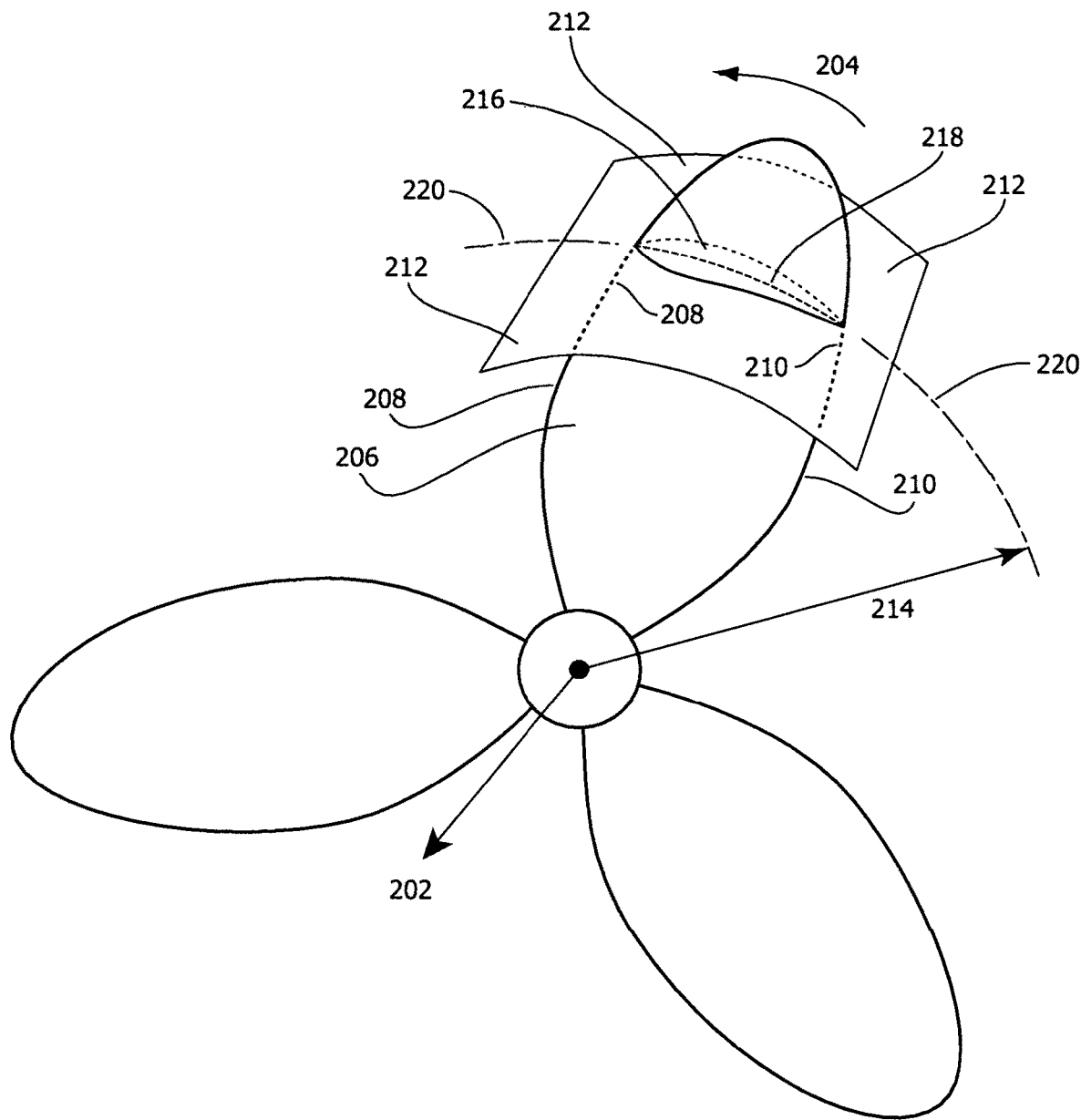
FIG. 1 is a perspective view of a three-blade propeller with a cylindrical blade-termination surface.

REFERENCE NUMERALS 202 axis of rotation
204 blade rotation direction
206 blade
208 blade leading edge
210 blade trailing edge
212 cylindrical termination surface
214 blade radius
216 cylindrical blade-tip end surface
218 cylindrical blade-tip chord
220 curved blade-tip chord extension
222 blade-tip leading edge point
224 blade-tip center point
226 blade-tip end point
228 geometric blade axis
230 planar blade-tip end area
232 high-pressure boundary layer outline
234 low-pressure boundary layer outline
236 straight blade-tip chord
238 blade-tip pitch line
240 plane of rotation
242 blade-tip pitch angle
244 two-dimensional isolator outline
246 isolator high-pressure end
248 isolator low-pressure end 250 planar chord length
252 isolator high-pressure interface point
254 isolator low-pressure interface point
256 isolator thickness
258 flat plate isolator
260 isolator leading edge
262 isolator trailing edge
264 isolator high-pressure edge
266 isolator low-pressure edge
268 isolator wedge
270 corkscrew isolator
272 rectangular plane
274 twisted surface
276 isolator reference point set
278 curved surface
280 curved twisted surface
284 blade-tip flow isolator

DETAILED DESCRIPTION

Propellers, rotors, screws, wind turbines, and other rotating mechanical devices that convert rotating shaft power to or from a fluid share the same structure. The geometry and blade count vary based on the specific application, but they are all rotating mechanical devices with two or more attached blades. The fluid can be compressible (such as air) or incompressible (such as water). The present invention provides methods and apparatus for increasing efficiency by adding a blade-tip flow isolator to each blade tip for all of these rotating mechanical devices. The isolator shape is derived from the blade-tip geometry and boundary layer outline. A twist is applied to the isolator along the curved blade-tip chord to further improve efficiency. In addition to improved efficiency, acoustic levels are also reduced.

All the Embodiments presented herein are built for a counter-clockwise rotation, looking down the axis of rotation upstream from the device. For a clockwise rotating device, the geometry needs to be modified to accommodate the clockwise rotation. The blade design is outside the scope of the invention, however the blade tip geometry and radius are required to interface with the present invention. Most blade tips in the prior art have a very short blade tip chord length. A method to generate a blade-tip end area from a generic propeller is shown in FIG. 1. This description can be applied to all rotating mechanical devices that convert rotating shaft power to or from a fluid using two or more attached blades.

FIG. 1. shows a generic propeller that rotates about an axis of rotation 202, with a blade rotation direction 204. A blade 206, a blade leading edge 208, and a blade trailing edge 210. A cylindrical termination surface 212, is a cylindrical surface with a center line coincident with the axis of rotation 202, at a desired blade radius 214. The blade 206, terminates into the cylindrical surface 212, generating a cylindrical blade-tip end surface 216. FIG. 1 shows how the blade 206, of a larger radius propeller can be modified by slicing the blade tip off at the desired blade radius 214, on the cylindrical surface 212, generating the cylindrical blade-tip end surface 216. A cylindrical blade-tip chord 218, is the blade chord on the cylindrical blade-tip end surface 216. A curved blade-tip chord extension 220, extends the cylindrical blade-tip chord 218, on the cylindrical blade-termination surface 212.

Figure 2:
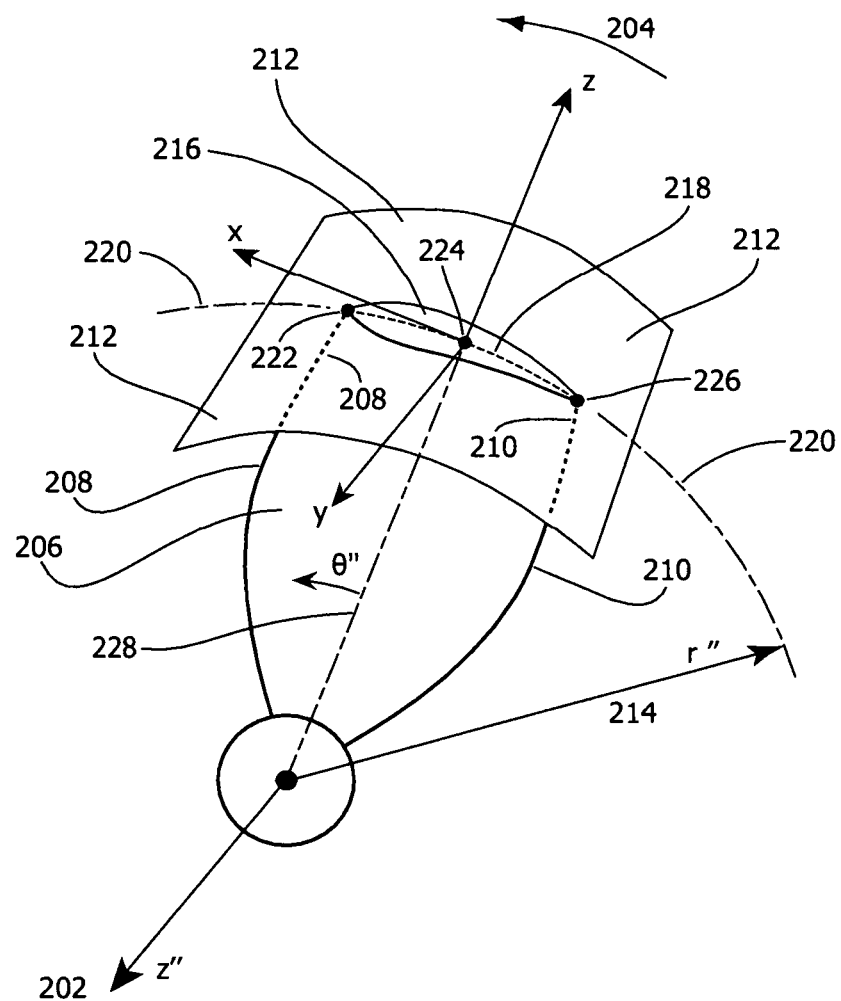
FIG. 2 is a perspective view of a blade with a blade-tip end area.

FIG. 2 shows the blade 206, the cylindrical blade-tip end surface 216, known or derived from the description in FIG. 1. A blade-tip leading edge point 222, is the leading edge point on the the cylindrical blade-tip end surface 216. A blade-tip end point 226, is the trailing edge point on the cylindrical blade-tip end surface 216. A blade-tip center point 224, is the point on the cylindrical blade-tip chord 218, centered between the leading edge point 222, and the end point 226. A geometric blade axis 228, is a straight line that intersects the blade-tip center point 224, the axis of rotation 202, and is perpendicular to the axis of rotation 202.

A Cartesian coordinate system, herein referred to as (XYZ), has an origin at the blade-tip center point 224, the y axis parallel to the axis of rotation 202, and pointing into the incoming fluid stream, the z axis coincident with the geometric blade axis 228, and pointing away from the axis of rotation 202. A cylindrical coordinate system, herein referred to as (r", θ", z"), has a z" axis coincident with the axis of rotation 202, that points into the receiving fluid stream. θ"=0 occurs at the blade-tip center point 224. The origin of (r", θ", z") is at the intersection of the axis of rotation 202, and the geometric blade axis 228. FIG. 2 shows Cartesian coordinate system (XYZ) with axes designated as x, y, and z. FIG. 2 shows cylindrical coordinate system (r", θ", z") represented by r", θ", z".

Figure 3:
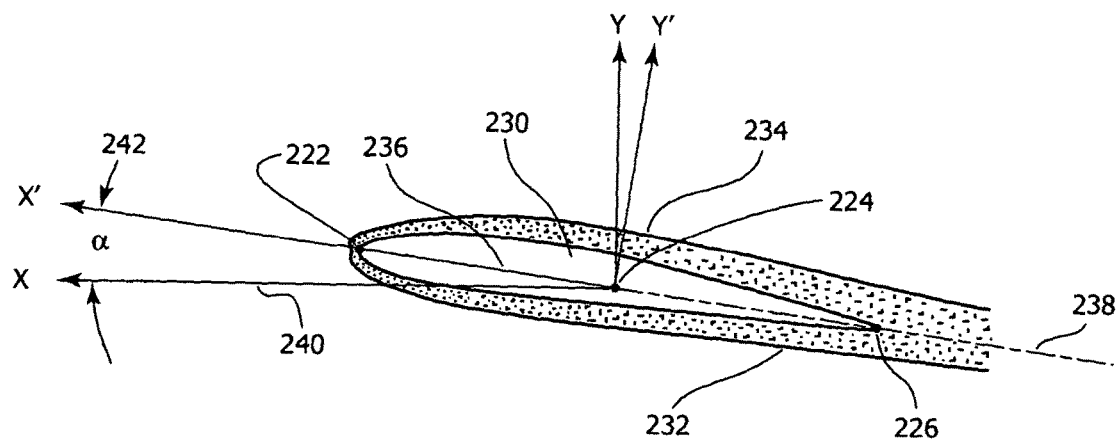
FIG. 3 is a boundary layer outline and blade-tip end area.

FIG. 3. shows the cylindrical blade-tip end surface 216, flattened onto the two-dimensional xy plane of coordinate system (XYZ) generating a planar blade-tip end area 230. A high-pressure boundary layer outline 232, a low-pressure boundary layer outline 234, located at the blade tip, must be known or estimated. These boundary layer outlines 232, and 234, can be for a single operating condition or a combination of operating conditions.

The required inputs for the present invention are: the planar blade-tip end area 230, the high-pressure boundary layer outline 232, the low-pressure boundary layer outline 234, and the desired blade radius 214. If the cylindrical blade-tip end surface 216, boundary layer outlines 232, and 234, are known in cylindrical coordinates system (r", θ", z"), they are flattened and transformed onto the xy plane of the (XYZ) coordinate system. An example of how to perform this transformation is shown by the equations below:

$x = (\theta''/360°)*(2\pi(\text{blade radius 214}))$ (where θ" is in degrees)

$y = z''$ $z = 0$ (two-dimensional plane)

The blade-tip leading edge point 222, the blade-tip end point 226, the blade-tip center point 224, are flattened onto the xy plane of coordinate system (XYZ). The cylindrical blade-tip chord 218, is also flattened onto the xy plane creating a straight blade-tip chord 236, a straight line which best intersects the points 222, 224, and 226. A blade-tip pitch line 238, is a straight line extending from the blade-tip chord 236, beyond the points 222, and 226. A plane of rotation 240, is a plane perpendicular to the axis of rotation 202, that intersects the center point 224, and is the xz plan of the (XYZ) coordinate system. A blade-tip pitch angle 242, is the angle between the blade-tip chord 236, and the plane of rotation 240, also shown as a.

A second Cartesian coordinate system, herein referred to as (X'Y'Z'), is the (XYZ) coordinate system rotated about the z axis of the (XYZ) coordinate system by the blade-tip pitch angle 242, such that the x' axis is coincident with the blade-tip chord 236. The origin of coordinate systems (X'Y'Z') and (XYZ) are at the blade-tip center point 224, shown in FIG. 3.

Embodiment 1

Figure 4:
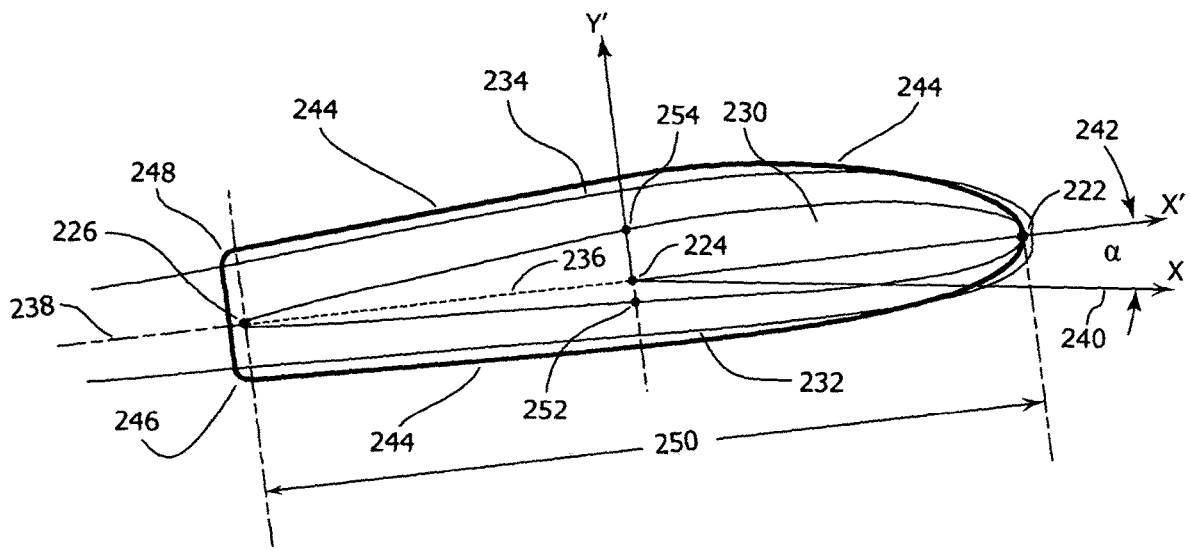
FIG. 4 is the two-dimensional isolator outline.

A two-dimensional isolator outline 244, is developed as a curve, starting at leading edge point 222, shown in FIG. 4.

The isolator outline 244, intersects the high-pressure boundary layer outline 232, and the low-pressure boundary layer outline 234, at a pre-determined distance down the blade-tip chord 236, towards the blade-tip center-point 224. The isolator outline 244, extends slightly beyond the high-pressure boundary layer outline 232, and extends slightly beyond the low-pressure boundary layer outline 234. This occurs at or before the blade-tip center point 224. The isolator outline 244, flattens and generally follows the boundary layer outlines 232, and 234, past the end point 226. An isolator high-pressure end 246, is a rounded corner that bends the isolator outline 244, by 90 degrees upward towards the low-pressure boundary layer. An isolator low-pressure end 248, is a rounded corner that bends the isolator outline 244, by 90 degrees downward towards the low-pressure boundary layer completing the isolator outline 244, shown in FIG. 4. Isolator outline 244, provides a physical barrier isolating the high-pressure boundary layer outline 232, and the low-pressure boundary layer outline 234, from the fluid outside of the blade tip, from leading edge point 222 to the blade-tip end point 226.

A planar chord length 250, is the length of the blade-tip chord 236, from the point 222, to the end point 226. An isolator high-pressure interface point 252, is at the intersection of the negative y' axis and the high pressure side of the planar blade-tip end area 230, outline. An isolator low-pressure interface point 254, is at the intersection of the positive y' axis and the low pressure side of the planar blade-tip end area 230, outline, shown in FIG. 4.

Figure 5:
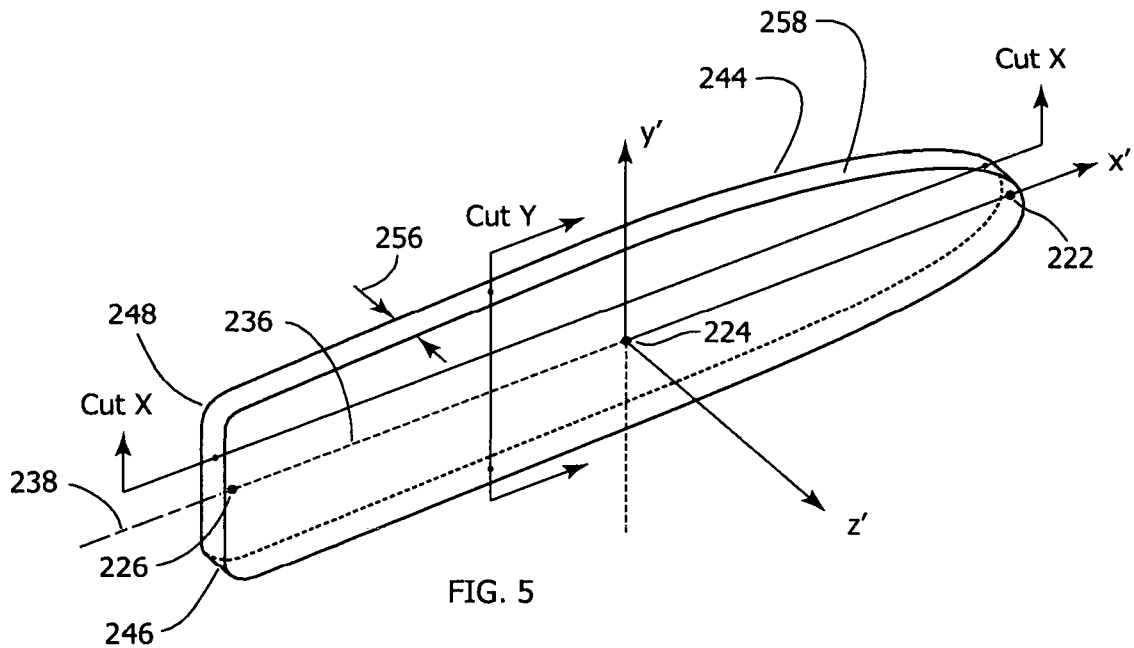
FIG. 5 is a perspective view of the flat plate isolator.

FIG. 5 shows the isolator outline 244, with an isolator thickness 256, applied to the isolator outline 244, along the z axis. The isolator thickness 256, is a pre-determined thickness. Half the thickness 256, is applied inward along the z-axis. Half the thickness 256, is applied outward along the z-axis, with the two-dimensional x'y' plane is in the center, creating a flat plate isolator 258. The location of Cut X and Cut Y are also shown in FIG. 5.

Figure 6:
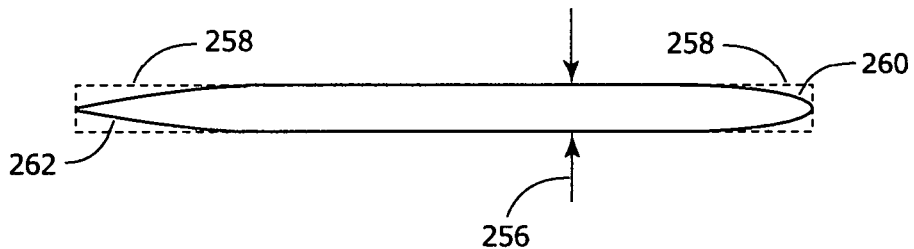
FIG. 6 is a view of Cut x from FIG. 5.

FIG. 6 shows Cut X from FIG. 5. The leading outer edge of the flat plate isolator 258, is curved to minimize drag and reduce mass, creating an isolator leading edge 260. The trailing outer edge of the flat plate isolator 258, is tapered to minimize drag and reduce mass, creating an isolator trailing edge 262.

Figure 7:
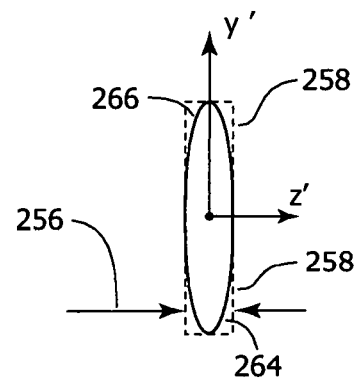
FIG. 7 is a view of Cut y from FIG. 5.
Figure 8:
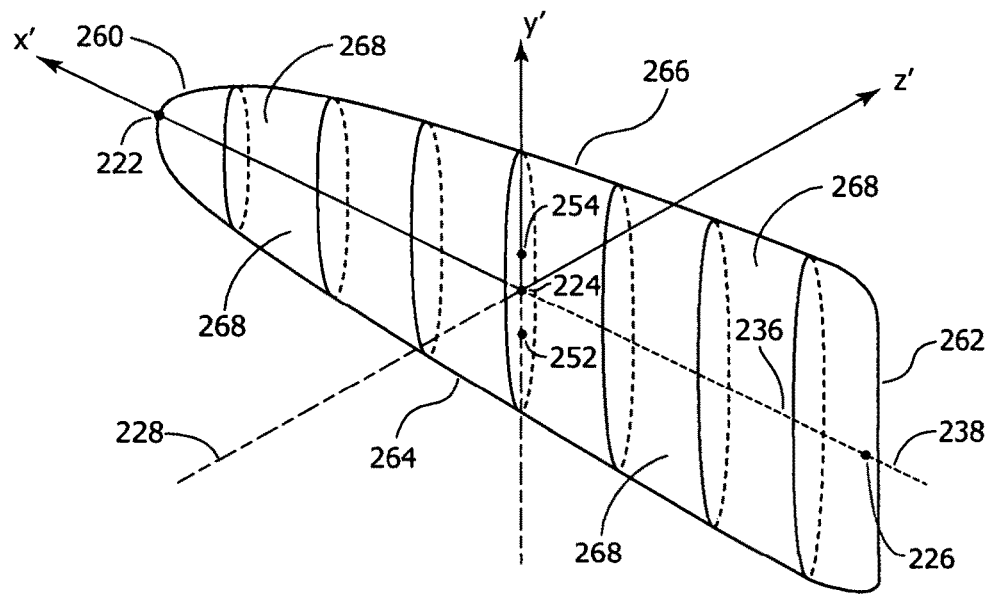
FIG. 8 is a perspective view of the isolator wedge.

FIG. 7 shows Cut Y from FIG. 5. The high-pressure outer edge of the flat plate isolator 258, from the isolator leading edge 260, to the isolator trailing edge 262, is curved to minimize drag and reduce mass, creating an isolator high-pressure edge 264. The low-pressure outer edge of the flat plate isolator 258, from the isolator leading edge 260, to the isolator trailing edge 262, is curved to minimize drag and reduce mass, creating an isolator low-pressure edge 266. The curved isolator high-pressure edge 264, and the isolator low-pressure edge 266, transition smoothly to the tapered isolator trailing edge 262. The curved isolator high-pressure edge 264, and the isolator low-pressure edge 266, transition smoothly to the isolator leading edge 260. The resulting three-dimensional shape is an isolator wedge 268, and resembles an air foil designed to pass through a fluid with minimum drag and lift, with the outline defined by the isolator outline 244, shown in FIG. 8.

Figure 9:
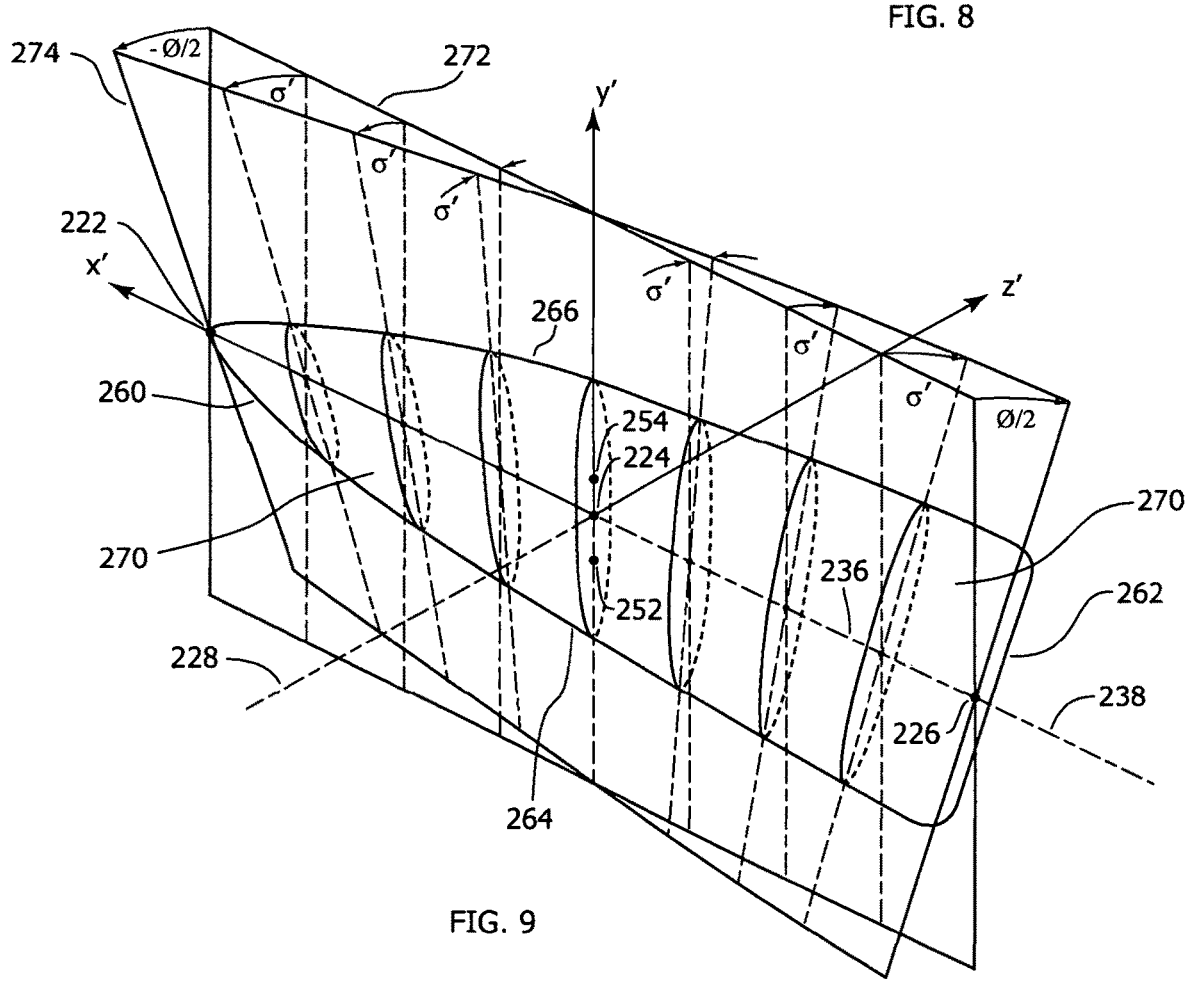
FIG. 9 is a perspective view of the corkscrew isolator.

An isolator twist angle is a pre-determined twist angle applied to the isolator wedge 268, along the x' axis, shown in FIG. 9 as Ø. The twist is applied in the opposite direction to the naturally occurring blade-tip vortices. The total angle of twist Ø, is evenly applied along the x' axis. Half the total twist angle is applied at leading edge point 222 in the negative direction along the x' axis. Half the total twist twist angle is applied at the isolator end point 226, in the positive direction along the x' axis. The twist angle varies linearly between the leading edge point 222, and the end point 226, along the x' axis and is represented by variable σ', shown in FIG. 9. The following equation is an example of how to calculate σ' for every x' value representing the wedge 268:

$$\sigma' = -((2x'/\text{chord length } 250) * \text{twist angle } \emptyset)$$

The twist must always be applied in the opposite direction to the naturally occurring blade-tip vortices. For devices that convert the kinetic energy of a fluid stream into rotating shaft power, the high-pressure side of the blade is the upstream blade surface and the the low-pressure side of the blade is the downstream blade surface. For example, the sign of σ' can be changed to achieve the correct configuration to maintain the shape to oppose the naturally occurring blade-tip vortices.

$$\sigma' = -\sigma' \text{ (from the previous example equation)}$$

The wedge 268, is twisted by applying a standard coordinate system rotation about the x' axis using angle σ' creating a corkscrew isolator 270, shown in FIG. 9. FIG. 9 shows a rectangular plane 272, which is a rectangular outline on the x'y' plane. The plane 272, is twisted about the x' axis creating a twisted surface 274. FIG. 9 also shows a series of slices from the corkscrew isolator 270, in the y'z' plane that are twisted along the x' axis. The points 222, 224, and 226, are on the x' axis and are therefore not twisted. The points 252, and 254, are in the center of the twist and are not twisted. The points 222, 224, 226, 252, and 254, are herein referred to as an isolator reference point set 276.

The corkscrew isolator 270, the reference point set 276, are represented by the coordinate system (X'Y'Z') and are transferred back to coordinate system (XYZ) using a standard coordinate system rotation about the z axis. The angle of rotation is the negative blade-tip pitch angle-a.

The corkscrew isolator 270, and the reference point set 276, are curved and transformed to cylindrical coordinates system (r", θ", z") such that the reference point set 276, now lies on the cylindrical surface 212. The following equations show an example of how the corkscrew isolator 270, and the point set 276, can be curved and transformed to the cylindrical coordinates system (r", θ", z"):

$$r'' = \text{blade radius } 214 + z$$

$$\theta'' = x(360°/(2*\pi*\text{blade radius } 214)) \text{ (in degrees)}$$

$$z'' = y$$

Figure 10:
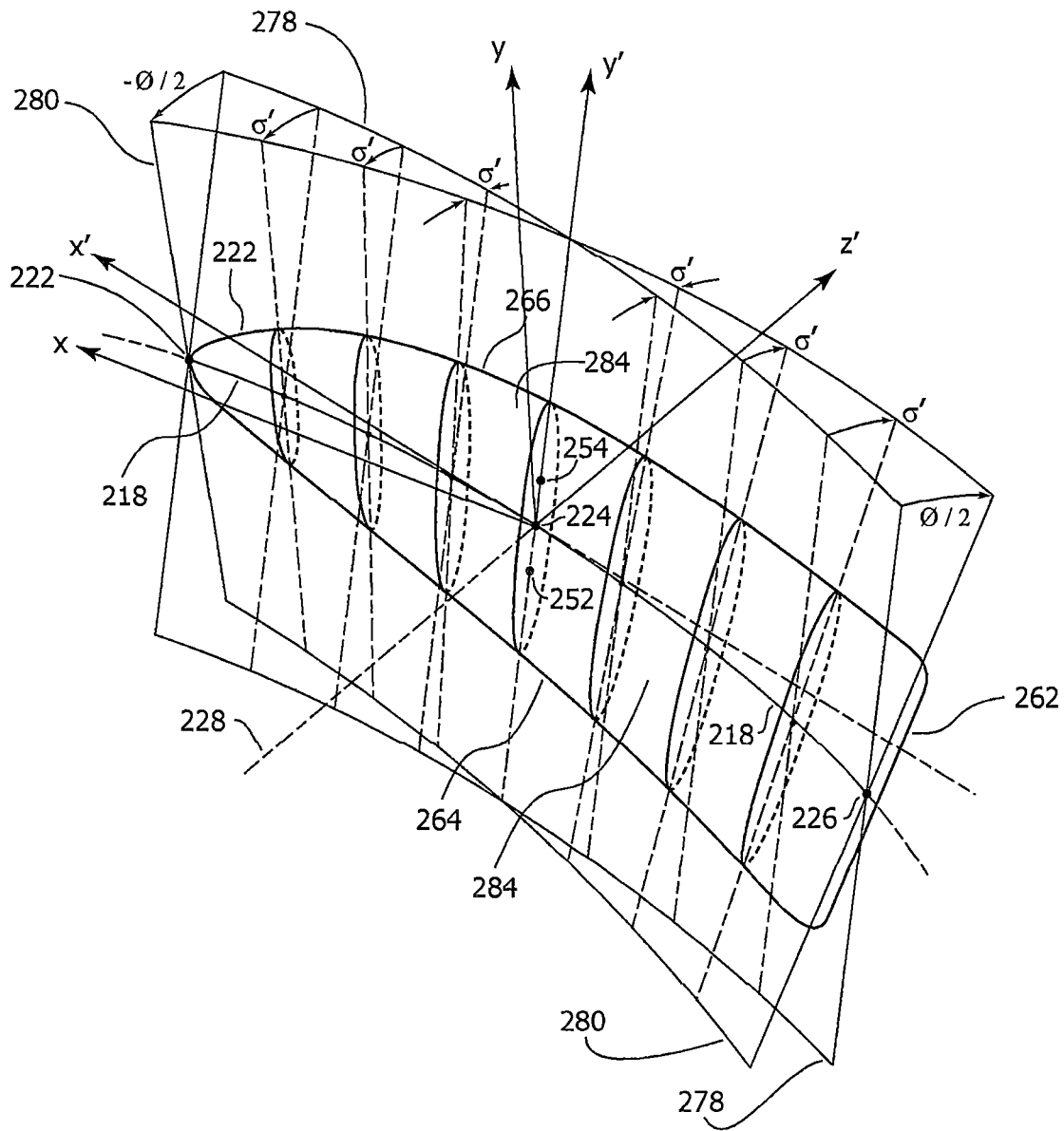
FIG. 10 is a perspective view of the twisted, curved blade-tip flow isolator, embodiment 1.

FIG. 10 shows the plane 272, curved and transformed into a curved surface 278, and the twisted surface 274, curved and transformed into a curved twisted surface 280. The blade-tip cord 236, is curved back onto the curved surface 278, and becomes the original cylindrical chord 218. Applying this transformation to the corkscrew isolator 270, creates a blade-tip flow isolator 284, embodiment 1, shown in FIG. 10. The blade-tip flow isolator 284, provides a physical barrier isolating and shielding the high-pressure boundary layer outline 232, and the low-pressure boundary layer outline 234, from the fluid outside the blade tip, reducing blade-tip vortices. Non-axial fluid flow components and acoustic levels are also reduced. The twist along the blade-tip chord further reduces blade-tip vortices and non-axial fluid flow components. A series of slices from the blade-tip isolator 284, are also shown for several locations along the cylindrical chord 218, showing the curved and twisted configuration.

The blade-tip isolator 284, embodiment 1, is aligned and connected to each blade 206, of the rotating mechanical device using the cylindrical chord 218, and the points in the reference point set 276, that are on the cylindrical blade-tip end surface 216. The connection of the blade-tip isolator 284, and the cylindrical blade-tip end surface 216, must be strong enough to handle static, dynamic, and transient structural loads, including centrifugal and aerodynamic loads, throughout the entire operating envelope and life-cycle of the rotating mechanical device. The connection of the blade-tip isolator 284, and the blade 206, should have no voids or extrusions.

Figure 11:
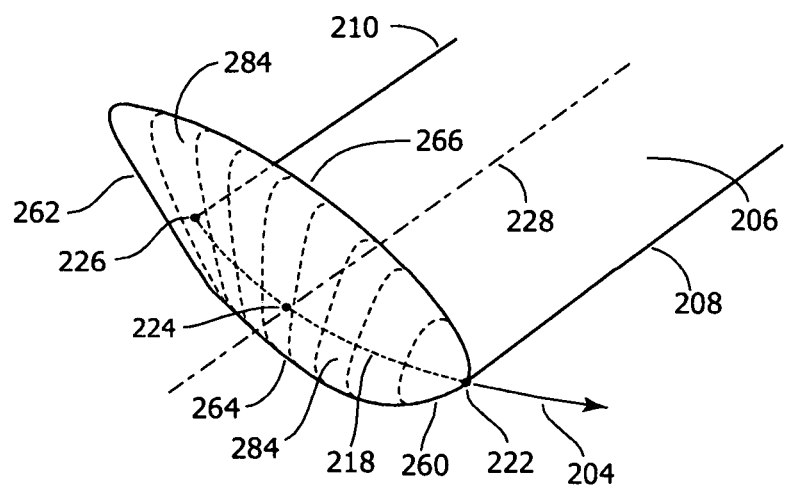
FIG. 11 is a perspective view of the blade-tip flow isolator connected to a blade, embodiment 1.

FIG. 11 shows the blade-tip isolator 284, embodiment 1, connected to the blade 206, aligned with the cylindrical chord 218, and points 222, 224, and 226. This configuration is for a rotating mechanical device that converts rotating shaft power to a fluid using two or more attached blades. For rotating mechanical devices that convert kinetic energy of a fluid stream into rotating shaft power, the twist along the cylindrical chord 218, would be in the opposite direction.

Figure 12:
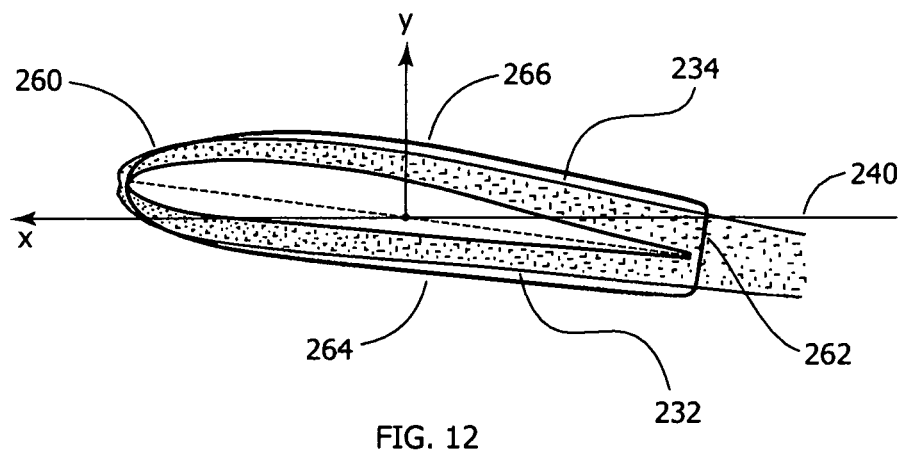
FIG. 12 is a sectional view looking away from the axis of rotation, along the geometric blade axis, from inside the blade radius.
Figure 13:
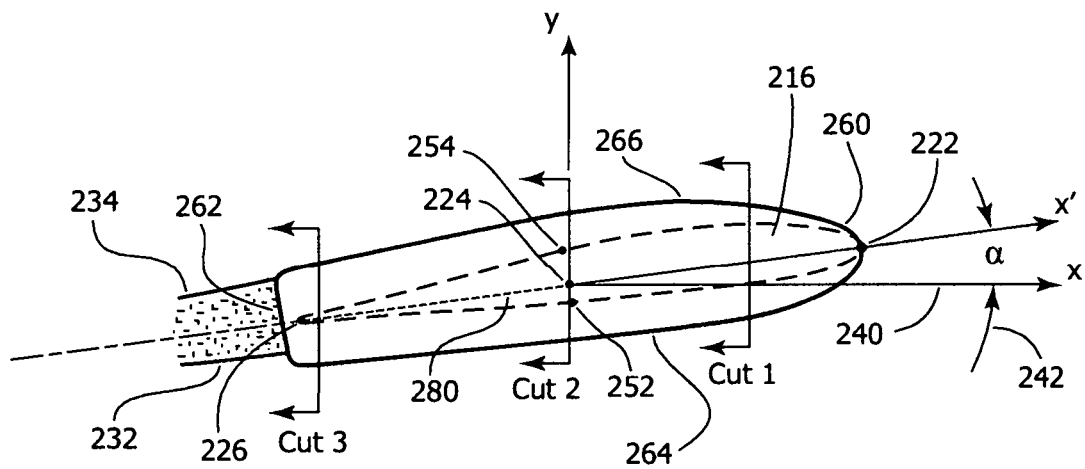
FIG. 13 is a sectional view looking along the geometric blade axis towards the axis of rotation, from outside the blade tip.

FIG. 12 shows a sectional view looking away from the axis of rotation along the geometric blade axis from inside the radius 214. This view shows the boundary layer shielded by the blade-tip isolator 284. FIG. 13 shows a view looking down the geometric blade axis towards the axis of rotation, from outside the radius 214. The locations of sectional cuts 1, 2, and 3 are also shown. These cuts are in a plane that is coincident with the propeller axis of rotation, z". This configuration is for a rotating mechanical device that converts rotating shaft power to a fluid using two or more attached blades.

Figure 14:
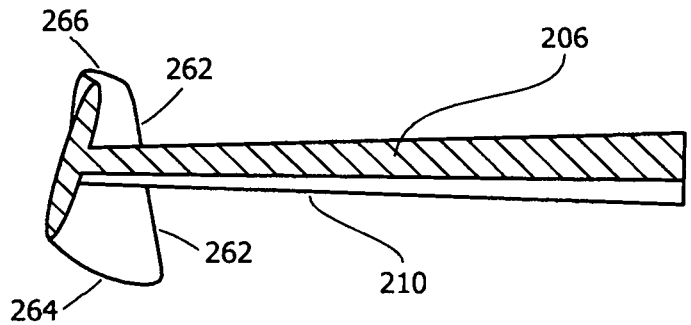
FIG. 14 is a sectional view of FIG. 13 at Cut 1, looking towards the isolator trailing edge.
Figure 15:
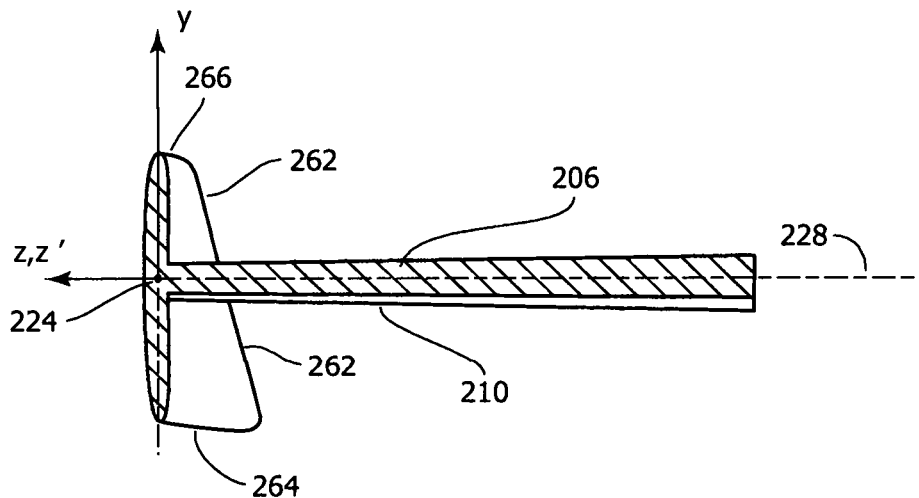
FIG. 15 is a sectional view of FIG. 13 at Cut 2, looking towards the isolator trailing edge.
Figure 16:
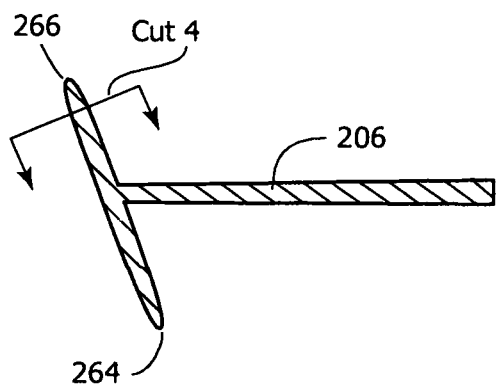
FIG. 16 is a sectional view of FIG. 13 at Cut 3, looking towards the isolator trailing edge.
Figure 17:
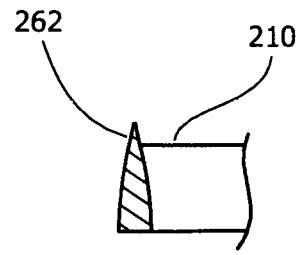
FIG. 17 is a sectional view of FIG. 16 at Cut 4, looking downward.

FIG. 14 shows sectional cut 1, which is a cut between the leading edge point 222, and the center point 224, looking towards the isolator trailing edge 262. FIG. 15 shows sectional cut 2, which is a cut at the center point 224, looking towards the isolator trailing edge 262, along the x axis. FIG. 16 shows sectional cut 3, which is a cut between the center point 224, and the end point 226, looking towards the isolator trailing edge 262. FIGS. 14, 15, and 16 also show the twisting corkscrew nature of embodiment 1 along the curved blade-tip chord 218. FIG. 17 shows sectional cut 4, showing the tapered outline of the isolator trailing edge 262.

The blade-tip isolator 284, embodiment 1, is built for a counter-clockwise rotating device. If the rotating mechanical device is designed to rotate in the opposite direction, the final geometry can be mirrored. For example, changing the sign of θ" in cylindrical coordinate system (r", θ", z") or the sign of x in Cartesian coordinate system (XYZ) can mirror the geometry for a clockwise rotating device.

Embodiment 2

Figure 18:
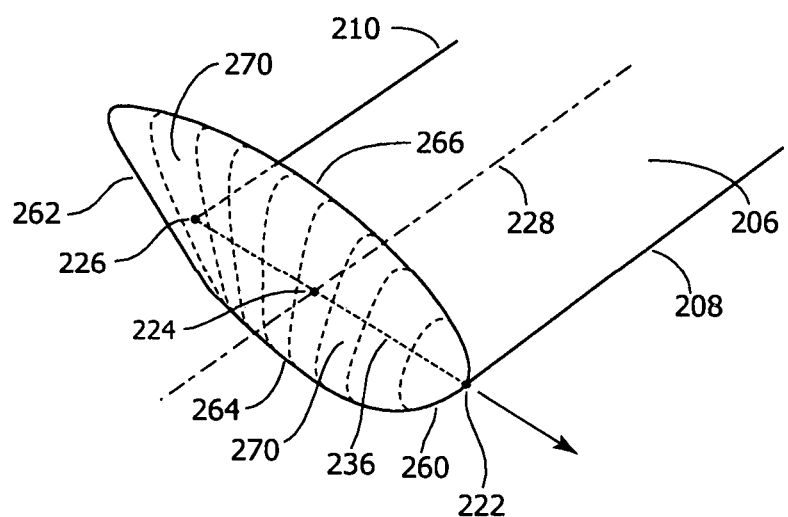
FIG. 18 is a perspective view of the corkscrew isolator connected to a blade, embodiment 2.

Embodiment 2 is the corkscrew isolator 270, shown in FIG. 9. It has a straight chord 236, that is aligned and connected to each blade 206, of the rotating mechanical device using the straight chord 236, at the blade tip. Points from the reference point set 276, while in the two-dimensional xy plane of coordinate system (XYZ) and represented by coordinate system (XYZ) can be used to align the corkscrew isolator 270, to the blade tip creating embodiment 2. FIG. 18. shows how the corkscrew isolator 270, is connected to the blade tip along the straight chord 236. Embodiment 2 can be used for configurations when the ratio of the blade-tip chord length to the blade radius is small. The connection must also be strong enough to handle static, dynamic, and transient structural loads, including centrifugal and aerodynamic loads, throughout the entire operating envelope and life-cycle of the rotating mechanical device, the same as for embodiment 1. For rotating mechanical devices that convert kinetic energy of a fluid stream into rotating shaft power, the twist applied along the straight chord 236, would be applied in the opposite direction, as done in embodiment 1.

The corkscrew isolator 284, embodiment 2, is built for a counter-clockwise rotating device, looking down the axis of rotation upstream from the rotating device. For a clockwise rotating device, the final geometry can be mirrored by changing the sign of x in Cartesian coordinate system (XYZ).

Operation

For applications that convert rotating shaft power into axial thrust, applying shaft power results in rotation, resulting in fluid flow along the axis of rotation, commonly used for axial thrust. For applications that convert kinetic energy from a fluid stream into rotating-shaft power, fluid flow along the axis of rotation will induce rotation, which can be converted into rotating-shaft power.

The invention claimed is:
1. A blade-tip flow isolator comprising:
a physical barrier extending from a blade-tip leading edge to a blade-tip trailing edge, extending to a blade-tip high-pressure boundary layer, extending to a blade-tip low-pressure boundary layer, connected to a blade-tip along a blade-tip chord, twisted along the blade-tip chord in an opposite direction to a naturally occurring vortex generated at the blade tip, configured onto a curved blade-tip chord configured to generate to a blade-tip flow isolator, whereby blade-tip vortices, non-axial fluid flow components, and acoustic levels are reduced.

2. A corkscrew isolator comprising:
a physical barrier connected to a blade tip along a blade-tip chord, isolating a blade-tip high-pressure boundary layer from a blade-tip low-pressure boundary layer, twisted along the blade-tip chord in an opposite direction to a naturally occurring vortex generated at the blade tip, configured to generate to a corkscrew isolator, whereby blade-tip vortices and non-axial fluid-flow components are reduced.

3. Said corkscrew isolator of claim 2, wherein said isolator is configured onto a curved blade-tip chord, configured to generate to a blade-tip flow isolator, whereby blade-tip vortices, non-axial fluid flow components, and acoustic levels are further reduced.

4. A method for reducing blade-tip vortices comprising:
a physical barrier extending from a blade-tip leading edge to a blade-tip trailing edge, extending to a blade-tip high-pressure boundary layer, extending to a blade-tip low-pressure boundary layer, connected to a blade-tip along a blade-tip chord, twisted along the blade-tip chord in an opposite direction to a naturally occurring vortex generated at the blade tip, configured onto a curved blade-tip chord configured to generate to a blade-tip flow isolator, whereby blade-tip vortices, non-axial fluid flow components, and acoustic levels are reduced.

* * * * *